(12) United States Patent
Wech

(10) Patent No.: US 7,975,805 B2
(45) Date of Patent: Jul. 12, 2011

(54) LUBRICATION SYSTEM

(75) Inventor: Michael J. Wech, Manitowoc, WI (US)

(73) Assignee: Oil-Rite Corporation, Manitowoc, WI (US)

( * ) Notice: Subject to any disclaimer, the term of this patent is extended or adjusted under 35 U.S.C. 154(b) by 1391 days.

(21) Appl. No.: 11/096,667

(22) Filed: Apr. 1, 2005

(65) Prior Publication Data
US 2006/0231341 A1 Oct. 19, 2006

(51) Int. Cl.
F01M 5/00 (2006.01)
(52) U.S. Cl. ............... 184/6.22; 184/104.1; 184/15.3
(58) Field of Classification Search ............. 184/6.22, 184/12, 15.1, 15.3, 104.1; 392/468
See application file for complete search history.

(56) References Cited

U.S. PATENT DOCUMENTS

| | | | | |
|---|---|---|---|---|
| 2,578,280 | A | * | 12/1951 | Barnard .......................... 174/95 |
| 4,085,821 | A | | 4/1978 | Kast et al. |
| 4,095,674 | A | | 6/1978 | Kido et al. |
| 4,131,658 | A | * | 12/1978 | Hirata et al. .................. 261/142 |
| 4,425,986 | A | | 1/1984 | Wedlin |
| 4,444,292 | A | | 4/1984 | Brown et al. |
| 4,725,713 | A | * | 2/1988 | Lehrke .......................... 392/472 |
| 4,784,578 | A | | 11/1988 | Gruett |
| 4,858,645 | A | * | 8/1989 | Reeves .......................... 137/551 |
| 5,372,220 | A | | 12/1994 | Jacobs et al. |
| 5,626,470 | A | | 5/1997 | Gerhardt |
| 5,669,839 | A | | 9/1997 | Graf et al. |
| 5,984,652 | A | | 11/1999 | Gruett et al. |
| 6,199,661 | B1 | | 3/2001 | Kumar |
| 6,199,663 | B1 | | 3/2001 | Roy et al. |
| 6,405,810 | B1 | | 6/2002 | Grach et al. |
| 6,478,115 | B1 | | 11/2002 | Wech et al. |
| 6,557,651 | B1 | | 5/2003 | Norby et al. |
| 6,705,432 | B2 | | 3/2004 | Conley et al. |

* cited by examiner

Primary Examiner — Robert Siconolfi
Assistant Examiner — Vu Q Nguyen
(74) Attorney, Agent, or Firm — Ryan Kromholz & Manion, S.C.

(57) ABSTRACT

A system for lubricating a lubrication target located within a refrigerated atmosphere. The system includes a lubricant source, a pressurized air source, and at least one pneumatically-activated pump in connection with the lubricant and air sources. The pump output is connected to a conduit that terminates at a spray nozzle for delivering the lubricant to the target in a controlled fashion. Pressurized air may be used to better control the lubricant delivery. The temperature of the lubricant and air flowing through the conduits is regulated so that the fluids will flow predictably at very cold temperatures.

8 Claims, 3 Drawing Sheets

LUBRICATION SYSTEM

BACKGROUND OF THE INVENTION

The present invention relates to lubrication systems and methods for chains and chain links and, specifically, lubrication systems and methods for chains and chain links in cold temperature environments, and more specifically, lubrication systems for chain and chain link conveyors in cold temperature environments.

Precision is a key focus when lubricating chains and chain links. Too much lubrication is a wasteful process, while not enough lubrication can cause damage and possibly failure. Proper lubrication can be a challenging problem, especially in cold weather environments. Industrial freezers, especially those used in the food processing industry are typically operated at subzero temperatures, possibly at temperatures of −40° F. (−40° C.) or lower. The viscosity of lubricants may be very high at such temperatures, and the lubricants may not flow properly, which can lead to wear and stress on each chain link in a chain conveyor system. Ultimately, this is likely to lead to catastrophic failure. In order to insure proper lubrication, presently it is common for an individual to manually lubricate the chain of a chain conveyor system while the system is operating. A manual lubrication process often results in uneven lubrication and, also, may be dangerous for the individual performing the lubrication process.

Devices, such as the pneumatically-activated pump disclosed in Gruett, U.S. Pat. No. 4,784,578 and Gruett et al., U.S. Pat. No. 5,984,652, allow for precise metering of lubricant onto an object to be lubricated, such as a conveyor chain link. The pump uses a piston in conjunction with a lubricant supply. The air flow atomizes the liquid, which is then delivered in small bursts onto the chain. However, these types of precise lubricant metering devices are designed for use in normal or ambient temperature environments. The present system utilizes these types of pumps that allow a precise amount of lubricant to be delivered to the conveyor. Specifically, the system efficiently delivers lubricant to the conveyor under severe temperatures.

Noby et al., U.S. Pat. No. 6,557,651, discloses various embodiments of a lubrication system and method for dispensing a lubricant to threads of a drill rod and/or a spindle of a horizontal directional drilling machine. The system uses heat transfer units coupled to an applicator to heat the lubricant before it is dispensed. However, the system is not designed for extreme temperature situations and does not necessarily independently sense changes in the movement of the object that is to be lubricated.

Wech et al., U.S. Pat. No. 6,478,115, provides a lubrication apparatus for a chain and trolley conveyor system. The system uses photoelectric sensors to determine specific areas of the chain for lubrication application. While the system delivers a precise and accurate amount of lubrication to the chain, it does not regulate the temperature of the lubricant, which is necessary in cold weather environments.

It is an object of the present invention to provide a chain lubrication system for use in cold weather environments that requires minimal or no human interaction during operation. It is a further object to provide a system that delivers a precisely metered amount of lubricant to each object to be lubricated. It is yet a further object of the present system to locate all key system components in a common, preferably enclosed, area for ease of use, monitoring and maintenance.

SUMMARY OF THE INVENTION

The present invention provides a system for lubricating a target point on an object to be lubricated. In the preferred embodiment, the object or objects are located within a refrigerated atmosphere. The target point is typically a specified area where two links of a chain conveyor are connected. The system allows for automated lubrication of a chain for a chain conveyor without a person being in close proximity to the chain (i.e. within the refrigerated atmosphere).

The system includes a lubricant source, an air source, a solenoid valve, a processor and pneumatically-activated pumps in connection with the lubricant and air source. The pump outputs are connected to a spray nozzle that will deliver the lubricant to the target point in a metered and controlled fashion. A sensing device monitors the target points and sends a signal to the processor thereby instructing the system when to dispense the lubricant. The temperature and viscosity of the lubricant flowing to the nozzle is regulated so that the lubricant will flow predictably, even at very cold temperatures.

DESCRIPTION OF THE PREFERRED EMBODIMENT

Although the disclosure hereof is detailed and exact to enable those skilled in the art to practice the invention, the physical embodiments herein disclosed merely exemplify the invention which may be embodied in other specific structures. While the preferred embodiment has been described, the details may be changed without departing from the invention, which is defined by the claims.

Figure 1:
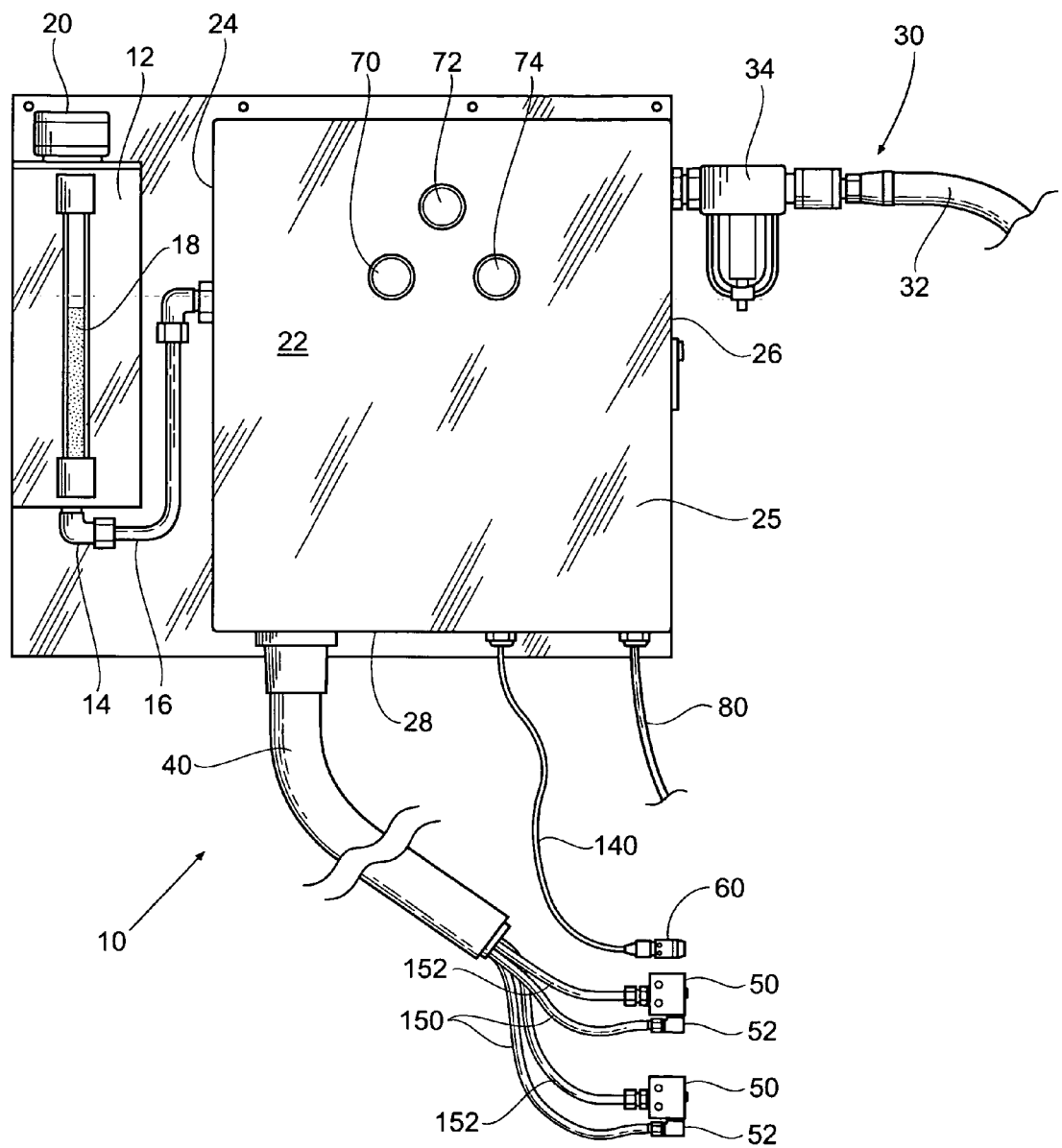
FIG. 1 is a diagrammatic representation of a lubrication system in accordance with the present invention.

FIG. 1 shows a lubrication system 10 according to the present invention. The lubrication system 10 comprises a lubricant reservoir 12 having a lubricant output port 14 connected to a conduit 16. Preferably, the reservoir 12 includes a sight glass 18 so that the level of lubricant in the reservoir 12 is easily discernable and a removable cap 20 so that the lubricant supply can be easily replenished. While the reservoir 12 is depicted within close proximity to the remaining components of the lubrications system 10, it is to be understood that the reservoir 12 could be located at a remote site. The conduit 16 passes through a sidewall 24 of a control box or housing 22. Because the system 10 may be used in an area containing food products, the housing 22 and the lubricant reservoir 12 are preferably made from stainless steel or other similar material to minimize potential contamination from the system 10. The system 10 also is connected to a pressurized air source 30, such as a conventional pressurized airline 32. The airline 32 may pass through an air filter and water separator 34 or similar device before it passes through sidewall 26 of housing 22 into the system 10. A trace bundle or bundles 40 pass through the bottom wall 28 of the control box 22. Each trace bundle 40 contains a heating element, lubricant supply lines or supply conduits 152 and air supply lines or supply conduits 150 for supplying lubricant to at least one spray nozzle 50. Each trace bundle 40 and the spray nozzles 50 will be discussed in further detail below. A sensor 60, such as an infrared photo sensor is located proximate to the spray nozzle 50. The sensor 60 and spray nozzle 50 will also be discussed in further detail below.

Still referring to FIG. 1, a plurality of control switches and/or monitoring devices 70, 72, and 74 are located on the front panel 25 of the control box 22. The switches and monitoring devices 70, 72, 74 allow an operator to control basic functions of the system 10, such as generally turning the system on/off and/or show a warning light or operating light for the system 10, without needing to access the internal components of the system 10 contained within housing 22.

The system 10 is preferably mounted on a flat vertical surface, such as a wall. The system 10 is used in connection with a refrigerator, freezer, meat locker, or other cold-climate environment that includes a conveyor. Ideally, the control box or housing 22 is mounted outside of the refrigerated environment. This allows an operator to monitor and control the lubrication system 10 without necessarily entering the refrigerated environment. However, the control box 22 may be mounted within the cold environment as well. Under this configuration, the control devices 70, 72, and 74 provide quick control for the system 10 so that an operator may spend minimal time within the refrigerator or freezer.

Referring further to FIG. 1, the system 10 is connected to a power source (not shown) by a power supply line 80. The power supply line 80 also passes through bottom wall 28 and provides the system 10 with an electrical power source, preferably a 110-volt or 220-volt A/C electrical power source.

Figure 2:
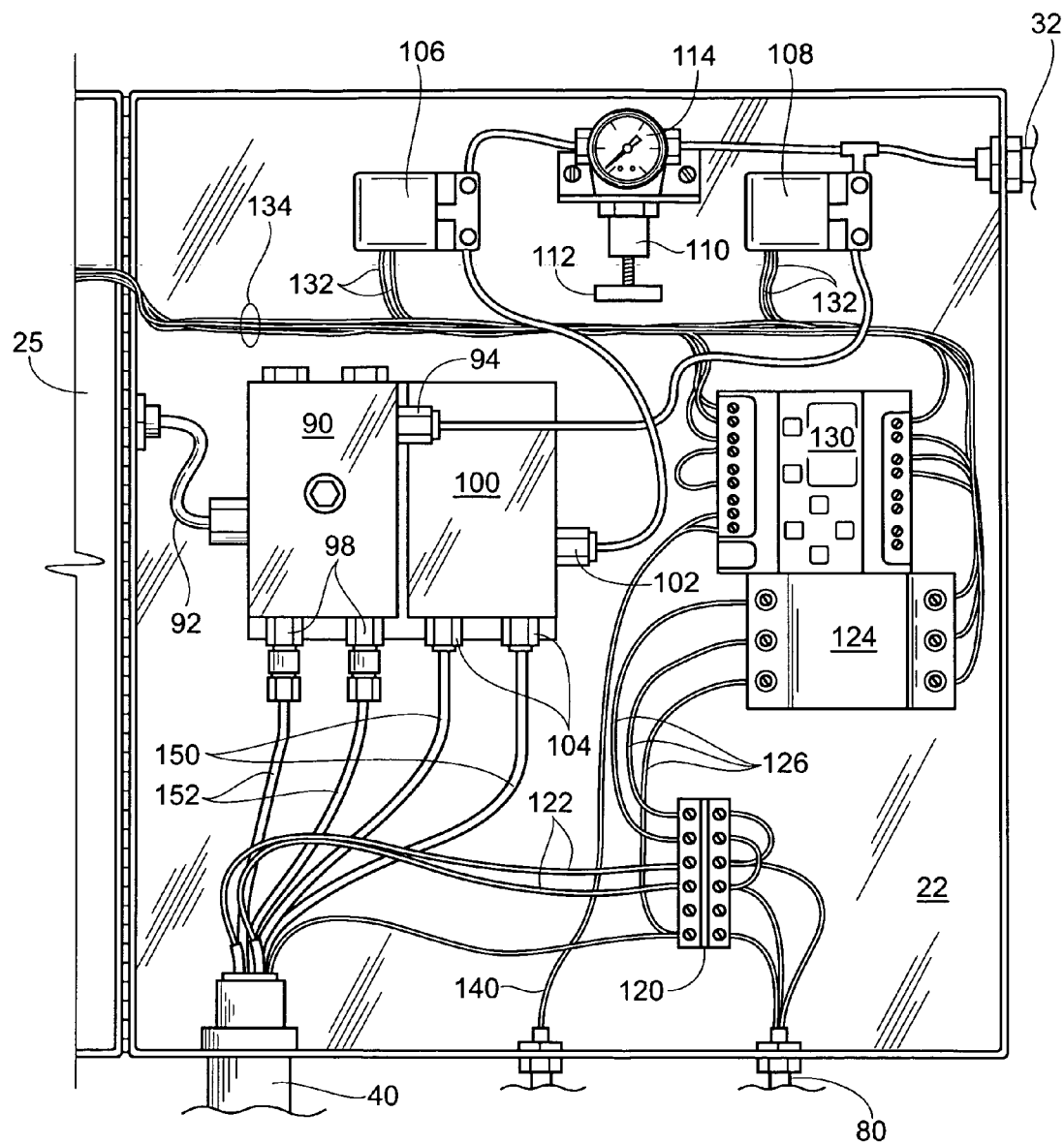
FIG. 2 is a detailed diagrammatic representation of a lubrication system in accordance with the present invention.

Referring now to FIG. 2, the control box 22 is shown with the front panel 25 in its open position. One or more fluid dispensing pumps 90 are mounted within the control box 22. Generally, the pumps 90 are arranged in a bank and have a common lubricant inlet 92, which is connected to a lubricant conduit 16 (see FIG. 1), which is connected to the lubricant reservoir 12. The pumps 90 also have a common pressurized air inlet 94, which is coupled to the airline 32. The pumps 90 preferably are light and compact, and will not drip, clog or form air pockets between each respective pump 90 and a corresponding nozzle 50. One such pump is the PurgeX® pump, manufactured by the Oil-Rite Corporation of Manitowoc, Wis., and described in U.S. Pat. No. 4,784,578 and U.S. Pat. No. 5,984,652, incorporated herein by reference.

As specifically depicted in FIG. 2, the system 10 contains a bank of two pumps 90, but it should be understood that the system 10 may operate with any number of pumps 90 as is necessary. The pumps 90 are designed so that a single pump 90 will provide the necessary means to deliver a precisely metered amount of fluid (i.e. lubricant) to a lubrication target point. In addition to the lubricant inlet 92, the air inlet 94 supplies pressurized air necessary to cycle each pump 90. Each pump 90 also has an outlet 98 connected to a conduit 152 for supplying the lubricant to the nozzle 50 (not shown in FIG. 2, but see FIG. 4).

In some applications, the pumps 90 are preferably arranged as sets of two, with each pair of lubricant pumps 90 providing lubrication to a selected lubrication target point. When the pumps 90 are arranged as sets of two, each set allows the lubrication to be applied to opposing sides of the target point (i.e. chain link) simultaneously. However, it is to be understood that any number of pumps and nozzles can be utilized in any combination and still fall within the scope of the present invention.

Adjacent the bank of the pumps 90 is a manifold 100. The manifold 100 has an inlet 102 for receiving pressurized air from solenoid valve 106, discussed in detail below. Pressure regulator 110 regulates the pressurized air. Multiple outlets 104 are provided in the manifold 100. Each outlet 104 is coupled to a conduit 150 for delivery of a pressurized air burst to each nozzle 50.

Still referring to FIG. 2, a pair of solenoid valves 106 and 108 is shown. The system 10 may have more or fewer solenoid valves, depending on the overall requirements of the system 10 and the equipment to be lubricated. The system 10 is preferably designed so that one solenoid valve 108 will control, or cycle, each of the pumps 90 in the bank of pumps. The second solenoid 106 provides the burst of pressurized air into the manifold 100 used to atomize or spray the lubricant as it is dispelled from each nozzle 50. The solenoid valves 106 and 108 have their inputs connected to the pressurized air source 30. Solenoid valve 108 receives airline pressure at its input port from pressurized airline 32. The amount of pressurized air supplied to solenoid valve 106 is controlled through a pressure regulator 110. The pressure regulator 110 may contain adjustment means 112, such as an adjustable valve and means for monitoring the line pressure traveling through a gauge 114.

Power supply line 80 enters control box 22 and terminates at terminal block 120. From terminal block 120, power is distributed to the trace bundle 40 through wires 122 and to a power supply 124 through wires 126. Power supply 124, in turn, supplies power to a programmable relay or programmable logic controller (PLC) 130 or similar device.

As will be further observed in FIG. 2, the solenoid valves 106 and 108 are electrically coupled to PLC 130 through wires 132, which provides control means for the various functions of the system 10. The PLC 130 receives an input signal from the sensor 60 (discussed below) and sends an output signal to the solenoid valves 106 and 108. The PLC 130 is also electrically connected to the buttons or monitoring controls 70, 72, and 74 (see FIG. 1) through wires 134, which, as previously noted, may consist of on/off switches and/or visual warning signals for the system 10 in case of malfunction.

Figure 4:
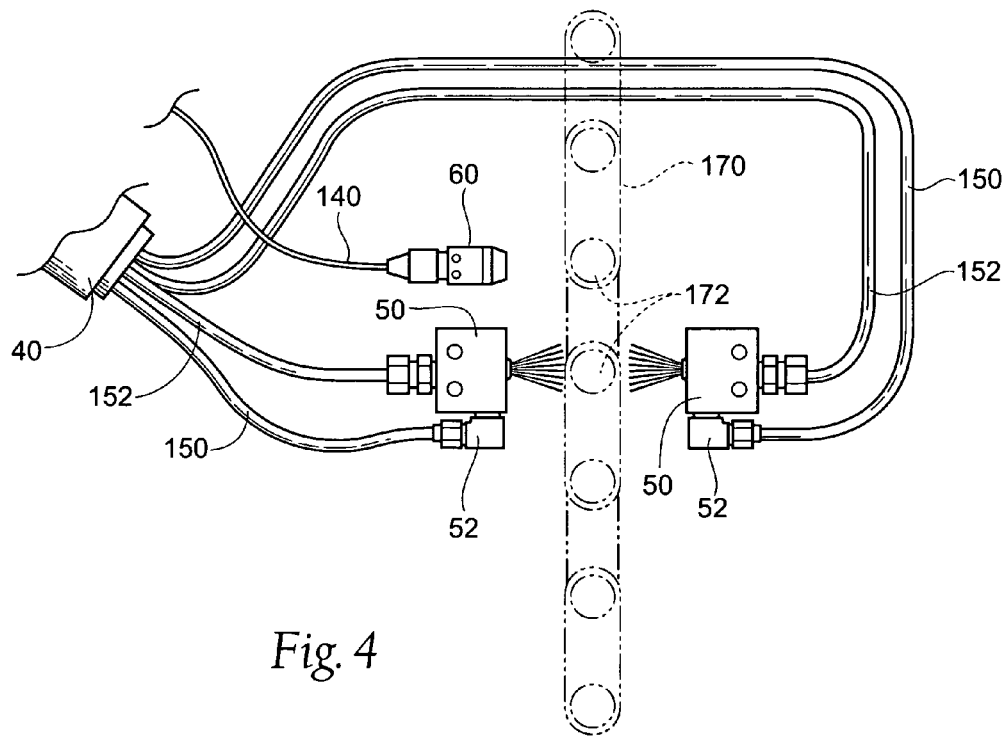
FIG. 4 is a top plan view of a spray nozzle and optical sensor lubricating a target point according to the present invention.

The PLC 130 receives its input signal or control pulse through a signal connection wire 140, which is connected to the sensor 60 (see FIGS. 1, 2 and 4). The PLC 130, in turn sends an output signal to the solenoid valves 106 and 108, causing each solenoid valve to open and close rapidly (i.e. fire). The firing of solenoid valve 106 produces a burst of air directed into manifold 100 that will provide the necessary pneumatic force to atomize or spray the fluid delivered to nozzle 50. The firing of solenoid valve 108 will provide the necessary pneumatic force for the pumps 90 to cycle and emit a predetermined amount of fluid, i.e. lubricant. It is to be understood that pumps 90 could be cycled hydraulically or electrically, and that any means of cycling falls within the scope of the present invention.

Figure 3:
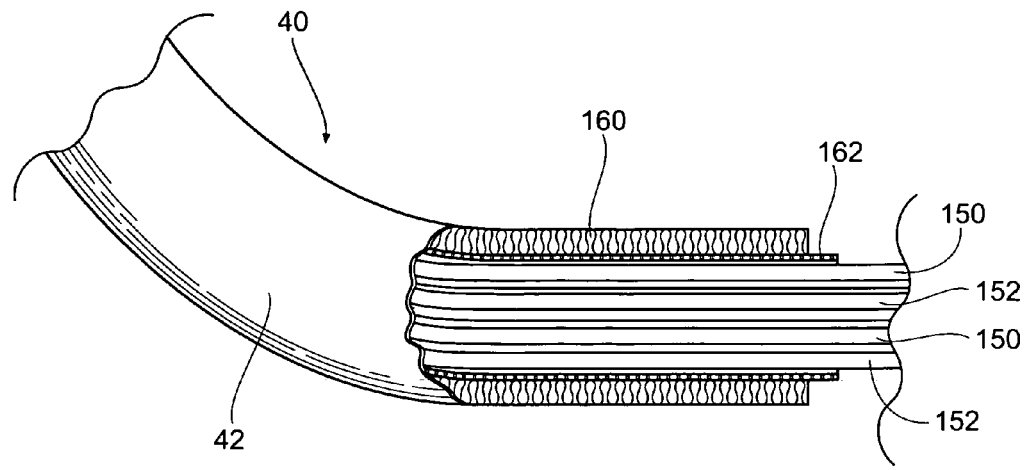
FIG. 3 is a partially cut-away view of a lubricant temperature regulating assembly in accordance with the present invention.

Referring to FIG. 3, a cut-away sectional view of the trace bundle 40 is shown. While only one trace bundle is depicted in the figures, it is to be understood that multiple trace bundles could be utilized and fall within the present invention. The outer cover 42 of the trace bundle 40 is preferably fabricated from a plastic or other suitable material. The trace bundle 40 contains the air conduits 150 and the lubricant conduits 152. It is understood that the number of lubricant conduits 152 traveling through the trace bundle 40 is determinative upon the number of pumps 90 that are in operation in a specific system 10, and the shown arrangement should not be considered limiting on the present invention. The trace bundle 40 contains a heating element 160, which provides means to control the temperature within the trace bundle 40. A layer of heat conducting material 162, such as aluminum surrounds the heating element 160 and the conduits 150 and 152 thereby retains the generated heat in close proximity to the conduits. The air conduits 150 are preferably made of a non-stick material, such as a Teflon®-based tubing. The lubricant conduits 152 are preferably made from stainless steel or a similar material. The heating element 160 is evenly spaced throughout the trace bundle 40, thereby providing consistent temperature regulation and control for the air and lubricant flowing through the conduits 150 and 152, respectively. The heating element 160 is also located along the entire length of the trace bundle 40. As a result, the proper viscosity is maintained from the lubricant pumps 90 to the nozzle 50, even in extremely cold environments. For example, even though the freezer may be kept at a temperature of −40° C. (−40° F.), the fluids within the trace bundle 40 will be maintained at an approximate temperature of 21° C. (70° F.). Thus, the lubricant will flow predictably from the pumps 90 to the nozzle 50, and the chance that condensation will form within each air conduit 150 is greatly reduced. Each lubrication target point will be properly lubricated over a wide range of temperatures, including temperatures near or below −85° C. (−121° F.).

FIG. 4 shows a close-up view of each nozzle 50 and the sensor 60. There may be more or less nozzles 50 or more sensors 60, as necessary. For illustration, two nozzles 50 and a single optical sensor 60 are shown. The nozzles 50 and optical sensor 60 are located proximate to a chain 170, which includes lubrication target points 172, as previously discussed. Each target 172 is preferably located where a pin or bushing connects two individual chain links 170, but the target 172 may be any area of an object that requires application of lubricant. The sensor 60 is aimed so that the light source emanating from the sensor 60 is interrupted as a target point 172 passes the sensor 60.

Once the target point 172 passes the sensor 60, an input signal is sent to the PLC 130. The PLC 130, in turn sends an output signal to the solenoid valves 108 and 106 thereby permitting pressurized air to flow into the pumps 90 and manifold 100, respectively. This causes each of the pumps 90 to cycle, which sends fluid through conduit 152 and to nozzle 50. The lubricant conduit 152 will release a predetermined and metered volume of lubricant into the nozzle 50 which is aimed towards the lubrication target point 172. The pressurized air conduit 150 receives its input from manifold 100 and delivers a burst of pressurized air to the nozzle 50 through fitting 52. The pressurized airburst atomizes or sprays the lubricant as it exits the nozzle 50, thereby dispersing the lubricant on the target point 172 and insuring proper lubrication of the target point 172. It should be noted that it is possible to discharge the lubricant without the pressurized airflow at the nozzle 50. However, the pressurized airflow helps the system 10 deliver a sprayed burst of lubricant to the target 172, especially at lower environmental temperatures. Furthermore, pressure regulator 110 can be adjusted to control the amount of pressurized air delivered to the nozzle 50. The amount of pressurized air correlates to the manner in which the lubricant is dispelled toward the lubrication target point 172.

Control and regulation of the temperature of the conduits 150 and 152 as they pass from the housing 22 to the nozzle 50 is a major advantage of the present system 10 over the prior art. Because the temperature of the fluids (i.e. lubricant and air) can be regulated and kept consistent throughout the length of the trace bundle 40, it is not necessary for the lubrication target point 172 to be necessarily located nearby the housing 22 and lubricant source 12. Thus, a remotely located conveyor can be lubricated without concern that the lubricant supply conduits 152 will become clogged, that air will be introduced into the lubricant supply downstream of the pumps 90 or that the lubricant will become too viscous to properly lubricate the target 172.

Another advantage of the system 10 is its ability to lubricate individual targets 172 that are not located near one another. For instance, in a refrigerated area, a device requiring lubrication may be located on one side of the refrigerated area and another may be located on the opposing side of the refrigerated area. The present invention would allow a single system 10 to lubricate both devices simultaneously, even though the lubrication targets are not near one another. Furthermore, it should be understood that the system 10 can be used to lubricate devices and objects other than conveyors and the present invention should not be limited to conveyor lubricating systems.

Safety is also increased with the present invention. Because the housing 22, lubricant supply 12, and air supply 30 do not have to be located proximate to the lubrication target 172, an operator may monitor the system and its components at a safe distance from the conveyor and with less chance of getting caught in the drive chain, which means less chance of potential injury than prior art systems. Furthermore, the main components do not necessarily need to be located within the refrigerated area, which further assists the operator in accessing the internal components of the housing and the like.

As noted, the system 10 can be modified to accommodate various arrangements and designs. The system may use more or fewer pumps 90 than shown, and the pumps 90 may be of any design that would properly convey fluid through the specific conduit lines to the dispensing device or nozzle 50. Likewise, the system 10 may be used to automatically lubricate a target by replacing the sensor 60 with a timer such that a predetermined amount of lubricant is dispersed at controlled time intervals. Also, the sensor 60 is not limited to an infrared photo sensor. For instance, the sensor 60 may be replaced with another type of optical sensor or a trip-type switch that is activated when a chain link passes the switch lever.

The foregoing is considered as illustrative only of the principles of the invention. Furthermore, since numerous modifications and changes will readily occur to those skilled in the art, it is not desired to limit the invention to the exact construction and operation shown and described. While the preferred embodiment has been described, the details may be changed without departing from the invention, which is defined by the claims.

I claim:

1. A system for lubricating a target located within a refrigerated atmosphere, said system comprising:
   a lubricant source;
   a pressurized air source;
   a pressure regulator;
   a pump in communication with said lubricant source;
   a spray nozzle, said spray nozzle connected to said pump by a lubricant supply line, said spray nozzle connected to said pressure regulator by an air supply line;
   a first solenoid for controlling said pump and a second solenoid for controlling an airburst released at said spray nozzle, said first solenoid being connected to said pump and said second solenoid being connected between said pressure regulator and said spray nozzle;
   said pressure regulator being adjustable to provide said airburst at a predetermined intensity;
   a programmable logic controller, said programmable logic controller being connected to said first and second solenoids;
   a sensor for sensing the target to be lubricated;

whereby said sensor sends a signal to the programmable logic controller which signals the first and second solenoids to each open independently at a predetermined time for a predetermined duration;

temperature regulating means for regulating the temperature of said air supply line wherein said temperature regulating means comprises a heating element positioned proximate to and extending longitudinally adjacent to said air supply line;

whereby condensation caused by said refrigerated atmosphere is substantially prevented from forming in said air supply line; and whereby said pump, said pressure regulator, said first and second solenoids, and said programmable logic controller are located outside said refrigerated atmosphere.

2. The system according to claim 1 wherein said pump is pneumatically-activated.

3. The system according to claim 1 wherein said sensor is a photoelectric sensor.

4. A system for lubricating a target located within a refrigerated atmosphere, said system comprising:
    a lubricant source;
    a pressurized air source;
    a pump in communication with said lubricant source;
    a valve in communication with said pressurized air source;
    a spray nozzle, said spray nozzle connected to said pump by a lubricant supply line, said spray nozzle connected to said valve by an air supply line;
    a programmable logic controller having a signal output, said signal output connected to said pump and said valve whereby said pump and valve are actuated at a predetermined time for a predetermined duration upon receipt of said signal output;
    temperature regulating means for regulating the temperature of said air supply line wherein said temperature regulating means comprises a heating element positioned proximate to and extending longitudinally adjacent to said air supply line;
    whereby condensation caused by said refrigerated atmosphere is substantially prevented from forming in said air supply line; and
    whereby said pump, said valve, and said programmable logic controller are located outside said refrigerated atmosphere.

5. The system according to claim 4 further including a sensor for sensing the target to be lubricated, said sensor being connected to said programmable logic controller.

6. The system according to claim 5 wherein said sensor is a photoelectric sensor.

7. The system according to claim 4 wherein said pump is a pneumatically-activated pump.

8. A method for lubricating a target in a refrigerated environment, the method comprising the steps of:
    providing a lubricant;
    providing means for pumping said lubricant;
    providing a source of pressurized air;
    providing a means for regulating said air pressure;
    providing a valve for dispensing said pressurized air in short bursts;
    providing a sensor;
    providing a first passageway for carrying said lubricant between said means for pumping said lubricant and said target;
    providing a second passageway for carrying said pressurized air between said source of pressurized air and said target;
    providing a programmable logic control means for receiving an input signal from said sensor, and sending a control signal to said means for pumping said lubricant and said valve for dispensing said pressurized air in short bursts;
    providing means for regulating the temperature of said pressurized air within said second passageway, said means for regulating the temperature of said pressurized air comprising a heating element positioned proximate to and extending longitudinally adjacent to said second passageway whereby condensation caused by said refrigerated environment is substantially prevented from forming in said second passageway;
    said means for regulating the temperature of said pressurized air also providing means for regulating the temperature of said lubricant within said first passageway whereby said lubricant is maintained at a predetermined viscosity for application; and wherein said means for regulating air pressure, said valve for dispensing said pressurized air in short bursts, and said programmable logic control means are located outside said refrigerated atmosphere.

* * * * *